US000001254H

United States Statutory Invention Registration [19]

[11] Reg. Number: H1254

Mostert

[43] Published: Nov. 2, 1993

[54] POLYMERIZATION PROCESS FOR BUTENE-1 AND ALPHA-OLEFIN MONOMERS

[75] Inventor: Simon Mostert, Santa Fe, N. Mex.

[73] Assignee: Shell Oil Company, Houston, Tex.

[21] Appl. No.: 870,080

[22] Filed: Apr. 17, 1992

[51] Int. Cl.[5] ..... C08F 4/44
[52] U.S. Cl. ..... 526/142; 526/348.6
[58] Field of Search ..... 526/142

[56] References Cited

U.S. PATENT DOCUMENTS 3,362,904 1/1968 Edwards et al. ..... 526/159
3,464,962 9/1969 Geacintov et al. .
4,478,989 10/1984 Goodall et al. ..... 526/142

FOREIGN PATENT DOCUMENTS 1278516 6/1972 United Kingdom ..... 526/162

*Primary Examiner*—Robert L. Stoll
*Assistant Examiner*—Joseph D. Anthony

[57] ABSTRACT

It is herein disclosed, a process for polymerizing butene-1 into homopolymers and copolymers, using a catalyst system containing titanium trichloride, diethylaluminum chloride, and a substituted phenol in specified molar proportions. It is further disclosed, products made by the inventive process, and articles of manufacture made from these products.

10 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

POLYMERIZATION PROCESS FOR BUTENE-1 AND ALPHA-OLEFIN MONOMERS

BACKGROUND OF THE INVENTION

This invention generally relates to polymerization. It is more particularly concerned with a process for polymerizing novel homopolymers or copolymers from monomers of butene-1 and one or more of a variety of alpha-olefins having 2–10 carbon atoms preferably including ethylene, propylene, and mixtures thereof, which involves a critical selection of reaction conditions, reactants, reactant properties, and catalyst components.

As is well known to those familiar with the art, butene-1 and propylene can each be homopolymerized into crystalline polymers. Such homopolymers have been produced with an isotactic index (measured as the weight percent insoluble in boiling diethyl ether) in the order of 95–98.

The resultant polybutene-1 has two major crystalline forms. Upon cooling from the melt, there is formed a metastable crystalline modification known as "Form II." Over a period of time, usually several days, the Form II modification transforms into a stable modification known as "Form I." The transformation from Form II to Form I is accompanied by dimensional change in the polymer. The dimensional instability of polybutene-1 renders it disadvantageous for many applications. For example, films which are initially clear lose their optical clarity as the polymer changes crystalline form. Known processes for polymerizing butene-1 are taught in a variety of patents including U.S. Pat. No. 3,464,962 assigned to Mobil.

The current process allows for polymerization of 1-butene homopolymers or copolymers of butene-1 and ethylene at temperatures from 130° F. to 160° F. using a catalyst consisting of titanium trichloride, diethylaluminum chloride, and diethyl aluminum iodide where the molar ratio of aluminum to titanium is between 2:1 and 4:1 and the molar ratio of diethylaluminum chloride to diethylaluminum iodide is 1:1 to 3:1.

The problems with the current process include: (1) low catalyst activity which limits rates due to the deashing step; (2) effluent toxicity; and (3) slow crystallization transformation rate.

A new process for polymerizing butene-1 has been discovered which involves a critical selection of reaction conditions, reactant proportions, and catalyst components.

The process without iodide produces butene-1 polymers with a higher degree of crystallinity than those made with the aluminum diethyl chloride/aluminum diethyl iodide as the cocatalyst.

Accordingly, it is a broad object of this invention to provide a new process for producing such butene-1 homopolymers and copolymers by utilizing a more economical and an environmentally safer polymerization process which prevents iodide from getting into the waste streams.

SUMMARY OF THE INVENTION

This invention provides a method for producing homopolymers and copolymers of butene-1 that comprises copolymerizing a monomer or mixture of monomers, such as butene-1 and one or more alpha-olefins having 2–10 carbon atoms preferably including ethylene, propylene, and mixtures thereof at a temperature of between about 130° F. and about 150° F., in the presence of a catalyst system consisting essentially of titanium trichloride, and a cocatalyst which is a mixture of substituted phenol and diethylaluminum chloride wherein the mole percent ratio of diethylaluminum chloride to substituted phenol is between about 4:1 and about 0.5:1 and the molar ratio of aluminum to titanium is between 3:1 and 6:1.

The invention further provides products made by the inventive process, and articles of manufacture made from these products.

DETAILED DESCRIPTION OF THE INVENTION

The resultant butene-1 homopolymers and copolymers of this invention have the desirable outstanding physical characteristics of toughness, good stress-crack properties, and high oxygen permeability. They have X-ray and infrared patterns typical of polybutene-1 homopolymer in the Form I crystalline modification and the present invention's method for making these polymers is now more economical and environmentally safer.

Upon cooling some of the copolymers of this invention from the melt (i.e., molten state), they transform extremely rapidly from Form II into stable Form I. In fact, Form II is usually virtually undetectable. Consequently, they are dimensionally stable and undergo no further crystalline change and, therefore, only a minimum post-crystallization is observed. The amount of post-crystallization is less than 0.5 percent by weight, as measured, over a 24-hour period, in a density gradient column, wherein the weight percent change of density of the polymer is measured as a function time.

The homopolymers and copolymers of this invention have a tensile modulus, determined by ASTM method D638 using a D412 sample, greater than 25,000 psi, usually between about 25,000 and about 35,000 psi.

The homopolymers and copolymers prepared by this unique method have outstanding electrical insulating properties, toughness, and flexibility. Accordingly, they are suitable for use in wire and cable insulation, plastic pipes, films, coatings, heavy duty bags, food wraps, and other applications, either by themselves or blended with other polymers.

The unique method of the present invention involves several critical factors that must be carefully controlled. These factors are the components of the catalyst composition, and the reaction conditions. The polymerization can be carried out in batch operation or in a continuous operation.

The monomers used in the novel method are butene-1 or with one or more of a variety of alpha-olefins having 2–10 carbon atoms preferably including ethylene, propylene, and mixtures thereof. The copolymerization process of this invention is carried out at temperatures of between about 130° F. and about 150° F. The contact time, or the average residence time in continuous operation is between about 1 hour and about 5 hours.

The catalyst system used in the process for producing the copolymers of this invention consists essentially of titanium trichloride, substituted phenol e.g. BHT, and diethylaluminum chloride. The molar ratio of diethylaluminum chloride to substituted phenol will be between about 4:1 to 0.5:1. The molar ratio of aluminum to titanium in the catalyst system will be between 3:1 and 6:1.

It is essential that the cocatalyst used herein is a mixture of diethylaluminum chloride (DEAC) and substituted phenol, for example, butylated hydroxytoluene (BHT). The use of substituted phenol alone with titanium trichloride ($TiCl_3$) results in a catalyst system of low activity. When only diethylaluminum chloride is used in the catalyst system, the polymers produced have a low tensile modulus.

Butylated hydroxytoluene (BHT) useful in the practice of this invention is 2,6-di-ter-butyl-p-cresol. It can be represented by the chemical formula $(C_{18}H_{37})_2CH_3C_6H_2OH$. It is commonly used as an antioxidant or heat stabilizer for polyolefins, such as polypropylene.

A preferred polymerization of butene-1 with propylene is demonstrated in the following examples.

EXAMPLES 1 to 5

A series of batch bulk polymerization runs were made using a charge feed containing 7 mole percent propylene, the balance being butene-1. All runs were carried out at 150° F. for one hour, except for Example 5 which was carried out at 140° F. for two hours. In each run, the catalyst system was titanium trichloride and diethylaluminum chloride and substituted phenol, in which the aluminum to titanium molar ratio and the molar ratio of DEAC t0 substituted phenoi were varied. Pertinent data and results of these runs are set forth in Table I.

TABLE I

| Example | DEAC/BHT[1] | Al/Ti[2] | Temp. °F. | Time, Hours | Wt. Percent Density Change | Tensile Modulus psi |
|---|---|---|---|---|---|---|
| 1 | 4 | 3 | 150 | 1 | 0.21 | 25,500 |
| 2 | 1.5 | 6 | 150 | 1 | 0.27 | 20,600 |
| 3 | 2.45 | 4 | 150 | 1 | 0.27 | 17,500 |
| 4 | 2 | 4 | 150 | 1 | 0.29 | 19,400 |
| 5 | 4 | 3 | 140 | 2 | 0.25 | 30,000 |

[1]Molar ratio of diethylaluminum chloride to substituted phenol (BHT).
[2]Molar ratio of aluminum to titanium.

As has been mentioned hereinbefore, some general considerations should be observed when operating within the aforedescribed ranges of conditions. When operating at temperatures of about 150° F., an aluminum to titanium molar ratio of about 3:1 is favored on short runs. (See Example 1, showing significant improvement in tensile modulus and in weight percent density change.) Usually though, higher molar ratios of diethylaluminum chloride to substituted phenol, approaching 4:1, are preferred. Using an aluminum to titanium molar ratio of 3:1 and a higher than 4:1 molar ratio of diethylaluminum chloride to substituted phenol, temperatures as low as 130° F. can be used effectively.

EXAMPLES 6 to 12

A series of batch bulk polymerization runs were carried out, varying the mole percent propylene in the butene-1 feed for each run. In each run, the catalyst components were titanium trichloride and a mixture of 80 mole percent diethylaluminum chloride (DEAC) and 20 mole percent butylated hydroxy toluene (BHT) (molar ratio of 4:1), wherein the molar ratio of aluminum to titanium was 3:1. Each run was carried out 50° F. for one hour.

For each polymer product, the weight percent density change over a 24-hour period and the tensile modulus were determined. The pertinent data for each run are set forth in

TABLE II

| Example | Feed, mole percent Butene-1 | Propylene | Wt. Percent Density Change | Tensile Modulus psi |
|---|---|---|---|---|
| 6 | 100 | 0 | | 33,300 |
| 7 | 98 | 2 | 1.85 | 41,000 |
| 8 | 97 | 3 | 1.39 | 39,600 |
| 9 | 96 | 4 | 0.96 | 38,000 |
| 10 | 95 | 5 | 0.40 | 33,300 |
| 11 | 94 | 6 | 0.23 | 29,100 |
| 12 | 90.4 | 9.6 | — | 21,400 |

From Table II, it will be noted that, as increasing amounts of polypropylene are used in the feed, the tensile modulus of the polymer increases, from 100% butene-1 to a maximum at about 2% propylene and then decreases. At between about 8% and 9% propylene, the tensile modulus has decreased to about 25,000 psi. Above about 9% propylene, the tensile modulus is well below the acceptable minimum of 25,000 psi for heavy duty purposes. Together with a high tensile modulus of at least about 25,000 psi, a copolymer of this invention must have dimensional stability, as evidenced by a post-crystallization of below about 0.5 weight percent.

Although the aforedescribed ranges of propylene content in the feed have been determined upon the basis of one set of reaction conditions, they are applicable to polymerization reactions carried out at other conditions within the ranges set forth hereinafter. When operating within these ranges of conditions, however, certain general relationships among the conditions should be observed, in order to achieve the production of the novel modulus and dimensional stability. These relationships are described and illustrated hereinafter.

EXAMPLES 13 to 18

A series of batch bulk polymerization runs were carried out at about 140° F. for one hour. In each run, the charge feed was a mixture of 8 mole percent propylene and 92 percent butene-1. In each run, the catalyst system was titanium trichloride and diethylaluminum chloride and substituted phenol (BHT), in which the aluminum to titanium molar ratio and the molar ratio of diethylaluminum dichloride to diethyl aluminum iodide were varied. Pertinent data and results of these runs are set forth in Table III.

TABLE III

| Example | DEAC/BHT[1] | Al/Ti[2] | Wt. Percent Density Change | Tensile Modulus psi |
|---|---|---|---|---|
| 13 | 2.45 | 3 | 0.20 | 25,500 |
| 14 | 2.45 | 4 | 0.30 | 26,900 |
| 15 | 2.45 | 5 | 0.10 | 30,300 |
| 16 | 2.45 | 6 | 0.22 | 26,000 |
| 17 | 2 | 4 | 0.22 | 27,500 |
| 18 | 2 | 6 | 0.21 | 29,700 |

[1]Molar ratio of diethylaluminum chloride to substituted phenol [BHT].
[2]Molar ratio of aluminum to titanium.

EXAMPLES 19 through 27

When operating on longer batch runs or at correspondingly longer residence times in continuous operation, aluminum to titanium molar ratios of between 4:1 and 6:1 are most feasible. This concept is demonstrated by the following examples.

A series of batch bulk polymerization runs were carried out at temperatures of about 140° F. or about 150° F. for four hours, except for Example 19 which was run for three hours. In each run, the charge feed was between 7–8.5 mole percent propylene, the balance being butene-1. In each run, the catalyst system was titanium trichloride and diethylaluminum chloride and substituted phenol (BHT), in which the aluminum to titanium molar ratio and the molar ratio of diethylaluminum chloride to BHT were varied. Pertinent data and results of these runs are set forth in Table IV.

TABLE IV

| Example | Mole Percent Propylene | DEAC/BHT[1] | Al/Ti[2] | Temp. °F. | Wt. Percent Density Change | Tensile Modulus psi |
|---|---|---|---|---|---|---|
| 19 | 8 | 4 | 3 | 150 | 0.62 | 21,300 |
| 20 | 7 | 4 | 6 | 150 | 0.47 | 29,700 |
| 21 | 7 | 1.5 | 6 | 150 | 0.31 | 29,900 |
| 22 | 7 | 1.5 | 6 | 140 | 0.18 | 32,000 |
| 23 | 8 | 1.5 | 6 | 140 | 0.24 | 32,600 |
| 24 | 8.5 | 0.67 | 6 | 140 | 0.27 | 26,600 |
| 25 | 8.5 | 1.5 | 4 | 140 | 0.27 | 26,600 |
| 26 | 8 | 0.67 | 4 | 140 | 0.18 | 29,600 |
| 27 | 8 | 0.67 | 4 | 150 | 0.22 | 25,600 |

[1]Molar ratio of diethylaluminum chloride to substituted phenol (BHT).
[2]Molar ratio of aluminum to titanium.

Although polymerization temperatures of about 150° F. can be used, higher tensile moduli are usually achieved when operating at about a lower temperature, for example 140° F. (compare Example Nos. 21 vs. 22 and Nos. 26 vs. 27).

EXAMPLE 28

A polymerization run was carried out in a continuous bulk polymerization unit. Rigorously anhydrous conditions were maintained. The charge was a mixture of 91.5 mole percent butene-1 and 8.5 mole percent propylene. The catalyst components were titanium trichloride and a mixture of 60 mole percent diethylaluminum chloride and 40 mole percent substituted phenol. The catalyst components were added at a rate to maintain a molar ratio of aluminum to titanium of 6:1. The copolymerization was carried out at a temperature of 140° F. The rate of addition of olefin monomers was adjusted to maintain an average residence time of 3.7 hours and copolymers product was continuously removed. Throughout the run the copolymer produced had the following characteristics:

| | |
|---|---|
| Isotactic index (percent insoluble in boiling diethyl ether) | 95–98 |
| Tensile modulus (ASTM D638) psi | 28–32,000 |
| Post-crystallization, wt. percent | 0.2–0.4 |
| Density, g/cc | 0.905–0.908 |
| Brittleness temp. | −23° C. |

It exhibited X-ray and infrared pattern characteristics of Form I polybutene-1.

EXAMPLE 29

A continuous bulk polymerization run was carried out as described in Example 28, except that the feed contained 8 mole percent propylene and 92 mole percent butene-1. The polymer produced had the following average properties:

| | |
|---|---|
| Isotactic index (percent insoluble in boiling diethyl ether | 95 |
| Tensile modulus (ASTM D638) psi | 28,500 |
| Post-crystallization, wt. percent | 0.3 |
| Density, g/cc | 0.9072 |

EXAMPLE 30

A continuous bulk polymerization run was carried out as described in Example 28, except that the feed contained 7 mole % propylene and 93 mole % butene. The polymerization temperature was 150° F., the aluminum to titanium molar ratio was 3:1, and the diethylaluminum chloride to substituted phenol molar ratio was 4:1. The tensile modulus of the polymer product was only about 16,900 psi, although the weight percent postcrystallization was 0.45.

As in any stereospecific process of this type, anhydrous conditions must be maintained and air and oxygen must be excluded. This is accomplished conventionally by operating the process under an atmosphere of inert gas, such as nitrogen. If it is desired to control the molecular weight of the copolymer, conventional materials for this purpose, such as hydrogen and carbon dioxide, can be added to the reaction system. Deactivation and removal of catalyst components from the reactor effluent and copolymer product recovery are effected by any of the various means well known to those skilled in the art.

The runs described in the foregoing specific working examples have been carried out using bulk polymerization techniques, i.e., without the use of solvents or slurrying media other than the 1-olefins charged, both in batch and in continuous operations.

EXAMPLE 31

A polymerization run was carried out in a 1-liter glass reactor. The reactor was charged with 600 ml of n-heptane under rigorously anhydrous conditions. The reactor was then pressurized with butene-1 to a pressure of 873 mm mercury at 150° F. hen 125 ml of additional n-heptane were added to the reactor followed by the addition of propylene until the equilibrium pressure was reached at 150° F. The feed contained 7.4 mole percent propylene and 92.6 mole percent butene-1. A catalyst system consisting of 0.247 g titanium trichloride and 1.9 cc of a mixture of diethylaluminum chloride and substituted phenol in a mole ratio of 4:1 was then flushed into the reactor with 75 ml of n-heptane. The reaction mixture was then stirred vigorously for a period of two hours at 150° F., during which time the pressure in the reactor had dropped to 392 mm mercury. Nitrogen was introduced into the reactor to increase the pressure to 403 mm. The reactor was continued for 40 additional minutes at 150° F., after which time it was quenched with methanol. The copolymer product had a post-crystallization of about 0.3 weight percent. No differences in properties between the copolymer of this example and a copolymer produced by bulk polymerization from a comparable feed composition could be observed.

Although the present invention has been described with preferred embodiments, it is to be understood that modifications and variations may be resorted to, without departing from the spirit and scope of this invention, as those skilled in the art will readily understand.

What is claimed is:

1. A method for producing butene-1 polymers that comprises polymerizing (a) butene-1 or a monomer mixture of butene-1 and one or more alpha-olefins having 2–10 carbon atoms;

(b) at a temperature between about 130° F. and about 150° F.; and (c) in the presence of a catalyst system consisting essentially of titanium trichloride, and a cocatalyst which is a mixture of diethylaluminum chloride and at least one substituted phenol and wherein the mole percent. ratio of diethylaluminum chloride to said substituted phenol is between about 4:1 and 0.5:1, and the molar ratio of aluminum to titanium is between about 3:1 and about 6:1.

2. A method as in claim 1 wherein (a) said temperature is about 140° F.;

(b) said mole percent ratio of diethylaluminum chloride to said substituted phenol is about 2.45:1; and (c) said molar ratio of aluminum to titanium is about 5:1.

3. A method as in claim 1 wherein (a) said temperature is about 140° F.;

(b) said mole percent ratio of diethylaluminum chloride to said substituted phenol is about 1.5:1; and (c) said molar ratio of aluminum to titanium is about 6:1.

4. A method as in claim 1 wherein (a) said temperature is about 140° F.;

(b) said mole percent ratio of diethylaluminum chloride to said substituted phenol is about 0.67:1; and (c) said molar ratio of aluminum to titanium is about 4:1.

5. A method as in claim 1 wherein (a) said temperature is about 150° F.;

(b) said mole percent ratio of diethylaluminum chloride to said substituted phenol is about 1.5:1; and (c) said molar ratio of aluminum to titanium is about 6:1.

6. A method as in claim 1 wherein said alpha-olefin monomer is selected from the group consisting of ethylene, propylene, and mixtures thereof.

7. A method as in claim 6 wherein said alpha-olefin monomer is ethylene.

8. A method as in claim 7 wherein said alpha-olefin monomer is propylene.

9. A product produced by the process of claim 1.

10. A shaped article of manufacture produced from the product of claim 9.

* * * * *